(12) United States Patent
Mackin et al.

(10) Patent No.: US 8,209,095 B2
(45) Date of Patent: *Jun. 26, 2012

(54) AGRICULTURAL HARVESTER WITH DUAL ENGINES AND POWER SHARING BASED ON ENGINE TEMPERATURE

(75) Inventors: Ryan Patrick Mackin, Milan, IL (US); Alan David Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/463,601

(22) Filed: May 11, 2009

(65) Prior Publication Data
US 2010/0286861 A1    Nov. 11, 2010

(51) Int. Cl.
*G06G 7/70* (2006.01)
*A01D 34/00* (2006.01)
(52) U.S. Cl. ................ 701/50; 56/10.7; 460/6
(58) Field of Classification Search .............. 56/10.2 R, 56/10.6, 10.7, 13.5–13.8; 460/6; 60/698; 701/50
See application file for complete search history.

(56) References Cited

U.S. PATENT DOCUMENTS

| | | | | |
|---|---|---|---|---|
| 2,689,621 A | * | 9/1954 | Donley | 180/53.1 |
| 4,131,170 A | * | 12/1978 | van der Lely | 180/22 |
| 4,448,157 A | * | 5/1984 | Eckstein et al. | 123/142.5 R |
| 5,373,198 A | * | 12/1994 | Lopez Jimenez | 307/68 |
| 5,488,817 A | * | 2/1996 | Paquet et al. | 56/10.2 R |
| 5,995,895 A | * | 11/1999 | Watt et al. | 701/50 |
| 6,474,068 B1 | * | 11/2002 | Abdel Jalil et al. | 60/716 |
| 7,013,646 B1 | * | 3/2006 | Serkh et al. | 60/698 |
| 7,788,889 B2 | * | 9/2010 | Sheidler | 56/10.7 |
| 7,992,370 B2 | * | 8/2011 | Sheidler et al. | 56/10.7 |
| 2005/0079949 A1 | * | 4/2005 | Suzuki | 477/2 |
| 2005/0133284 A1 | | 6/2005 | Alster et al. | |
| 2007/0130950 A1 | * | 6/2007 | Serkh et al. | 60/698 |
| 2008/0243359 A1 | * | 10/2008 | Shinogi | 701/102 |
| 2009/0233664 A1 | * | 9/2009 | Sheidler et al. | 460/119 |

FOREIGN PATENT DOCUMENTS

| | | |
|---|---|---|
| EP | 2100494 A2 | 9/2009 |
| EP | 2100787 A2 | 9/2009 |
| EP | 2135501 A1 | 12/2009 |
| GB | 709777 A * | 6/1954 |
| JP | 57076263 A * | 5/1982 |

OTHER PUBLICATIONS

European Search Report received Jun. 14, 2010 (4 pages).

* cited by examiner

*Primary Examiner* — Thomas B Will
*Assistant Examiner* — Joan Misa

(57) ABSTRACT

An agricultural harvester includes a first power unit and a second power unit. The first power unit is couplable with a first primary load, including a threshing system load. A first temperature sensor associated with the first power unit provides a first output signal. A second temperature sensor associated with the second power unit provides a second output signal. A first motor/generator is mechanically coupled with the first power unit, and a second motor/generator is mechanically coupled with the second power unit. The second motor/generator and the first motor/generator are electrically coupled together. At least one electrical processing circuit is coupled with the first temperature sensor, second temperature sensor, first motor/generator and second motor/generator. The at least one electrical processing circuit is configured for selective bidirectional transfer of electrical power between the first motor/generator and the second motor/generator, dependent on the first output signal and the second output signal.

22 Claims, 2 Drawing Sheets

AGRICULTURAL HARVESTER WITH DUAL ENGINES AND POWER SHARING BASED ON ENGINE TEMPERATURE

FIELD OF THE INVENTION

The present invention relates to work machines, and, more particularly, to work machines including an internal combustion engine which may be used to drive primary and external loads.

BACKGROUND OF THE INVENTION

A work machine, such as a construction work machine, an agricultural work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque, characteristics for associated work operations.

The step load response of an IC engine in transient after a load impact is a feature/mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) With respect to the requirements of emissions legislation (e.g., visible smoke, nitrous oxides (NOx), etc.), noise or vibrations. The load impact may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine codling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

Engine systems as a whole react in a linear manner during the application of a transient load, initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

The demands for increased performance and fuel economy will increase significantly for work machines within the next decade. This will be complicated by the implementation of devices to reduce emissions. The increasing size and productivity of work machines is expected to result in power demand higher than will be available from economical single internal combustion engines. This will drive the development of vehicles using very large, heavy and expensive industrial engines. The complexity and cost of such engines may be prohibitive and curtail the implementation of higher capacity machinery.

What is needed in the art is a work machine and corresponding method of operation providing sustained, increased power capability with many of the advantages of electric-IC engine hybrids, while still meeting increasingly stringent emissions requirements.

SUMMARY OF THE INVENTION

The invention in one form is directed to an agricultural harvester with a first power unit and a second power unit. The first power unit is couplable with a first primary load, including a threshing system load. A first temperature sensor associated with the first power unit provides a first output signal. A second temperature sensor associated with the second power unit provides a second output signal A first motor/generator is mechanically coupled with the first power unit, and a second motor/generator is mechanically coupled with the second power unit. The second motor/generator and the first motor/generator are electrically coupled together. At least one electrical processing circuit is coupled with the first temperature sensor, second temperature sensor, first motor/generator and second motor/generator. The at least one electrical processing circuit is configured for selective bidirectional transfer of electrical power between the first motor/generator and the second motor/generator, dependent on the first output signal and the second output signal.

The invention in another form is directed a work machine including a first power unit and a second power unit. The first power unit is couplable with a first primary load. The second power unit is mechanically independent from the first power unit. A first temperature sensor associated with the first power unit provides a first output signal, and a second temperature sensor associated with the second power unit provides a second output signal. A first motor/generator is mechanically coupled with the first power unit, and a second motor/generator is mechanically coupled with the second power unit. The second motor/generator and the first motor/generator are electrically coupled together. At least one electrical processing circuit is coupled with the first temperature sensor, second temperature sensor, first, motor/generator and second motor/generator. The at least one electrical processing circuit is configured for selective, bidirectional transfer of electrical power between the first motor/generator and the second motor/generator, dependent on the first output signal and second output signal.

The invention in yet another form is directed a method of operating an agricultural harvester, including the steps of: driving a threshing system load with a first power unit; driving a propulsion load with a second power unit, the second power unit being mechanically independent from the first power unit; driving a first motor/generator with the first power unit; driving a second motor/generator with the second power unit; sensing a first temperature associated with the first power unit and a second temperature associated with the second power unit; determining if the first power unit or second power unit is in an overload state, dependent upon the first temperature and second temperature, respectively, and bidirectionally transferring electrical power between the first motor/generator and second motor/generator, dependent upon the determined overload state.

DETAILED DESCRIPTION OF THE INVENTION

Figure 1:
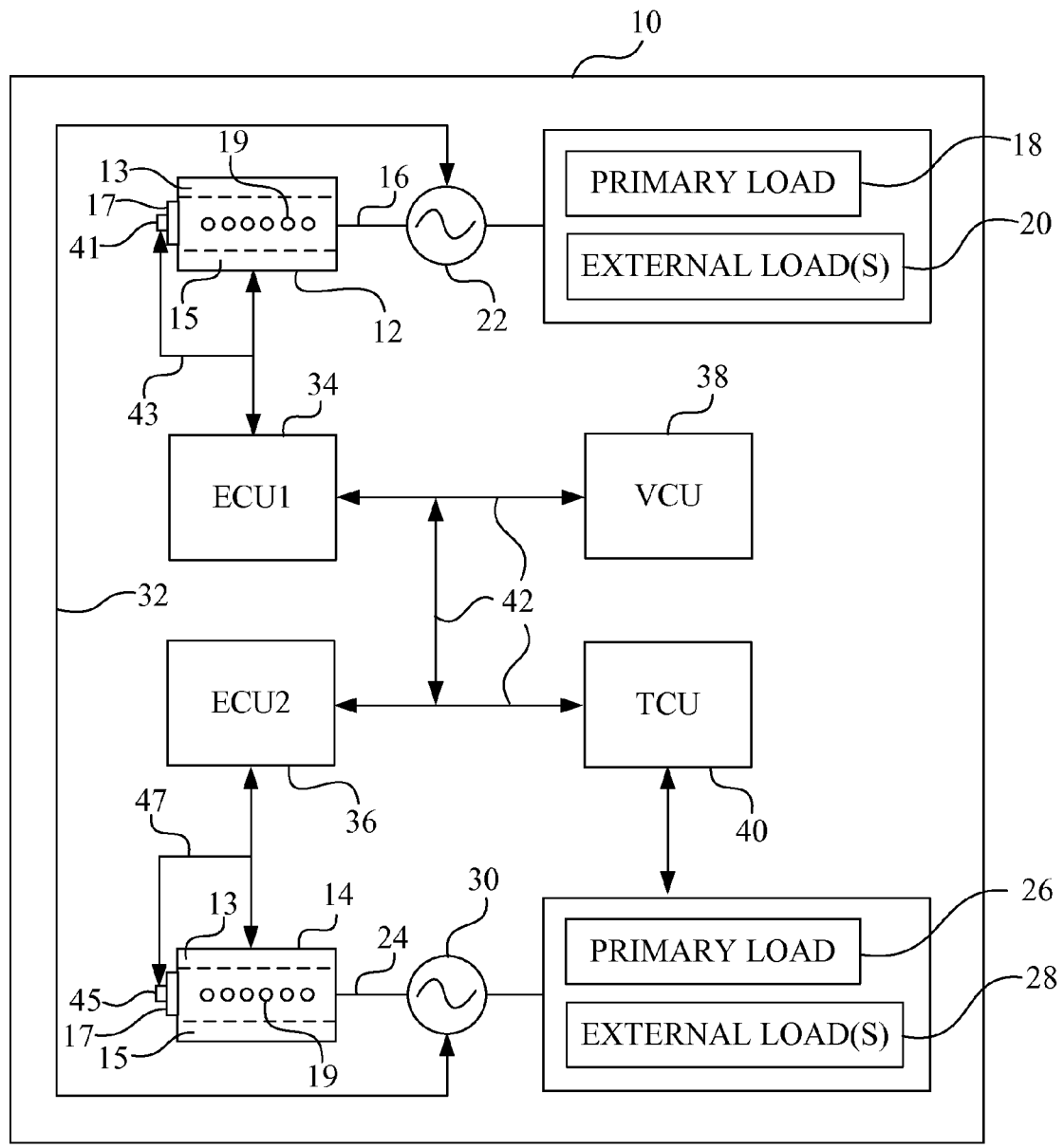
FIG. 1 is a schematic illustration of an embodiment of a work machine of the present invention.

Referring now to FIG. 1, there is shown a schematic illustration of an embodiment of a work machine 10 of the present invention. Work machine 10 is assumed to be an agricultural work machine in the form of a John Deere agricultural combine, but could be a different type of work machine such as a construction, forestry, mining, or industrial work machine.

Work machine 10 includes a first power unit in the form of a first IC engine 12, and a second power unit in the form of a second IC engine 14. First IC engine 12 and second IC engine 14 each include a number of conventional components, such as an intake manifold 13, exhaust manifold 15, radiator 17, combustion cylinders 19 and respective pistons (not shown), etc.

First IC engine 12 has a first drivetrain, typically including an output crankshaft 15, with a first rated output which drives a first primary load 18, and optionally one or more external loads 20. First primary load 18 is a threshing system load associated with one or more of the following: a cutting platform; a header; a feeder housing; a rotor; a separator; and a residue chopper. First primary load 18 preferably is a drivetrain load which is mechanically driven by first IC engine 12, but can also be electrically driven by a first motor/generator 22.

Second IC engine 14 is mechanically independent from first IC engine 12. Second IC engine 14 has a second drivetrain, typically including an output crankshaft 24, which drives a second primary load 28, and one or mom external loads 28, Second IC engine 14 has a second rated output which is approximately the same as the first rated output of first IC engine 12. In the embodiment shown, first IC engine 12 and second IC engine 14 are each assumed to have a rated output of 250 kW.

Second primary load 26 is a propulsion load for selectively propelling work machine 10 across the ground. To that end, an IVT in the form of a hydrostatic transmission may be selectively engaged/disengaged with crankshaft 24, and provides motive force to one or more drive wheels. Of course, it will be appreciated that in the case of a track-type work vehicle, crankshaft 24 may be coupled with a ground engaging track. Second primary load 26 preferably is a drivetrain load which is mechanically driven by second IC engine 14, but can also be electrically driven by a second motor/generator 30.

The one or more external loads 28 may include one or more auxiliary loads, and may also include one or more parasitic loads. Auxiliary loads are non-drivetrain hydraulic or electric loads placed upon second IC engine 14 through selective operator intervention (e.g., an auxiliary hydraulic load such as an unloading auger on a combine, a front end loader, a backhoe attachment, etc.) Parasitic loads are non-drivetrain loads placed upon second IC engine 14 through normal operation of the work machine, without operator intervention (e.g., an electrically drivers engine cooling fan associated with first IC engine 12, etc.). The external loads can be powered from individual electric motors powered by second motor/generator 30, or can optionally be powered directly from second motor/generator 30.

In the embodiment shown in FIG. 1, external toads 20 are optional toads that can be placed upon first IC engine 12, and all of the external loads 28 are carried by second IC engine 14. This is because it is anticipated that slug loads carried by first IC engine 12 from the threshing system may be high, and the external loads are thus shifted to second IC engine 14. However, it is possible to split the external loads between first IC engine 12 and second IC engine 14, dependent upon expected loads, size of the IC engines (which could be the same or different), number of external loads, etc.

First IC engine 12 and second IC engine 14 are each assumed to be a diesel engine in the illustrated embodiment, but could also be a gasoline engine, propane engine, etc. IC engines 12 and 14 are sized and configured according to the application.

First motor/generator 22 and second motor/generator 30 are electrically coupled together via power line 32 to pass electrical power back and forth between first motor/generator 22 and second motor/generator 30. When receiving electrical power, the particular motor/generator 22 or 30 is operated as a motor to add mechanical power to the output from a respective IC engine 12 or 14, as wilt be described in more detail, below.

An electrical processing circuit for controlling operation of work machine 10 generally includes a first engine control unit (ECU) 34, a second ECU 38, a vehicle control unit (VCU) 38, and a transmission control unit (TCU) 40. First ECU 34 electronically controls operation of first IC engine 12, and is coupled with a plurality of sensors (not specifically shown) associated with operation of first IC engine 12. For example, ECU 34 may be coupled with sensor(s) indicating engine control parameters such as an engine operating temperature, air flow rate within one or more intake manifolds, engine speed, fueling rate and/or timing, exhaust gas recirculation (EGR) rate, turbocharger blade position, etc. Additionally, ECU 34 may receive output signals from VCU 38 representing vehicle control parameters input by ah operator, such as a commanded ground speed (Indicated by a position of the gear shift lever and throttle and/or hydrostat lever) or a commanded direction of work machine 10 (indicated by an angular orientation of the steering wheel).

Similarly, second ECU 36 electronically controls operation of second IC engine 14. ECU 38 operates in a manner similar to ECU 32 described above, and will not be described in further detail. It will also be appreciated that for certain applications, ECU 34 and ECU 38 can be combined into a single controller.

TCU 38 electronically controls operation of the IVT making up second primary load 26, and is typically coupled with a plurality of sensors (not shown) associated with operation of the IVT. ECU 34, ECU 36, VCU 38 and TCU 40 are coupled together via a bus structure providing two-way data flow, such as controller area network (CAN) bus 42.

Although the various electronic components such as ECU 34, ECU 38, VCU 38 and TCU 40 are shown coupled together using wired connections, it should also be understood that wireless connections may be used for certain applications.

According to an aspect of the present invention, first ECU 34 is coupled with a first temperature sensor 41 and first motor/generator 22. First temperature sensor 41 provides an output signal over line 43 to first ECU 34 indicative of an operating temperature of first IC engine 12. In the embodiment shown in FIG. 1, first temperature sensor 41 is coupled with radiator 17 to sense the temperature of liquid coolant within radiator 17. First temperature sensor 41 could also be positioned elsewhere in association with the liquid coolant within first IC engine 12, such as a port on the engine block in communication with the liquid coolant. First temperature sensor 41 could also sense a different operating parameter providing ah indication of the operating temperature of first IC engine 12. For example, first temperature sensor 41 could be positioned in association with the intake air to intake manifold 13 or exhaust from exhaust manifold 15 to provide ah output signal indicative of ah operating temperature of first IC engine 12.

Similarly, second ECU 36 is coupled with a second temperature sensor 45 and second motor/generator 30. Second temperature sensor 45 provides an output signal over line 47 to second ECU 36 indicative of an operating temperature of second IC engine 14. Second temperature sensor 45 can be positioned in association with the liquid coolant within radiator 17, intake air within intake manifold 13, or exhaust gas, within exhaust manifold 15, as described above with regard to first temperature sensor 41.

Figure 2:
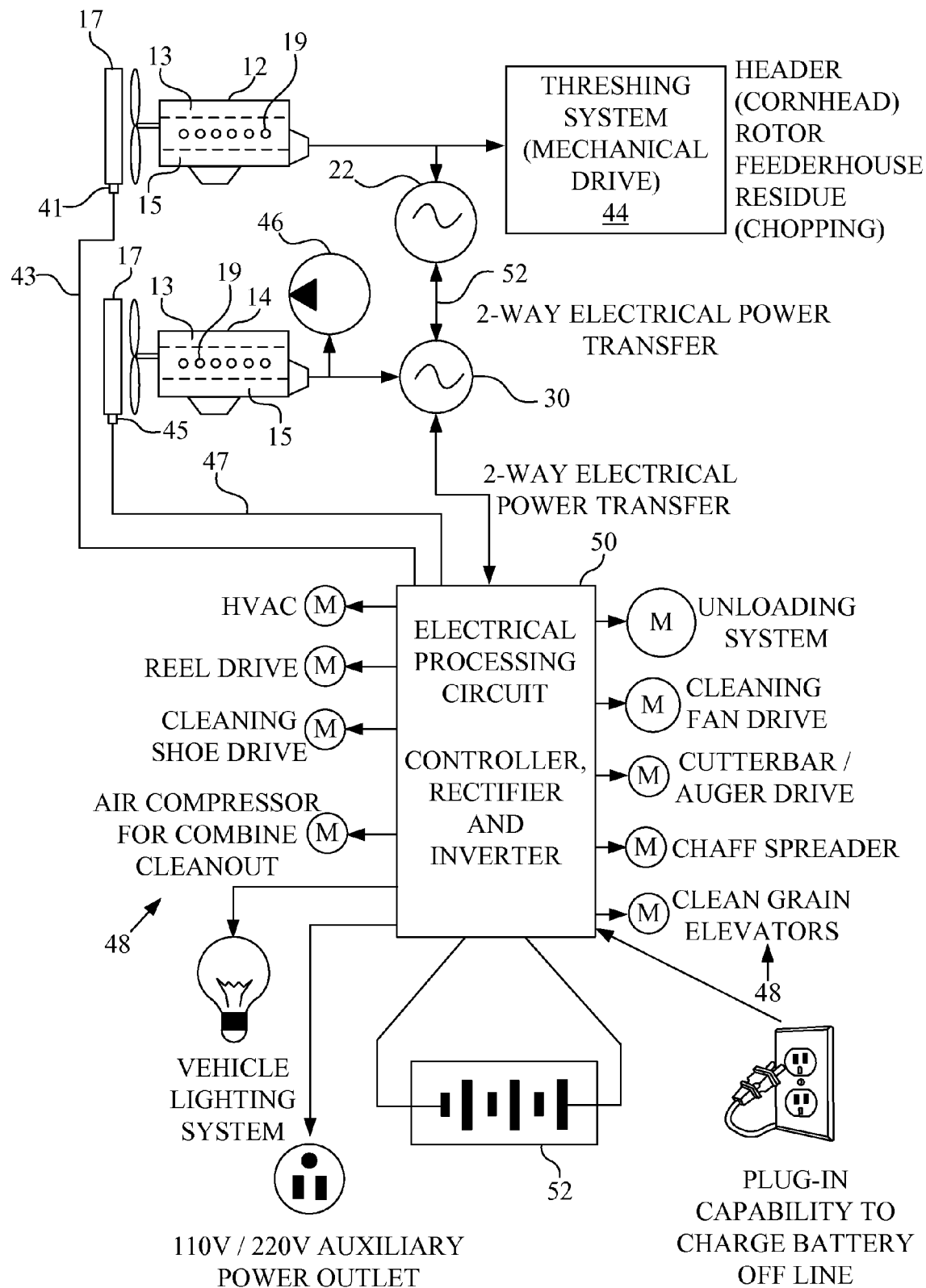
FIG. 2 is a schematic illustration of a particular embodiment of a work machine of the present invention in the form of an agricultural combine.

Referring now to FIG. 2, a specific embodiment of work machine 10 of the present invention in the form of an agricultural combine will be described in greater detail. The primary loads driven by first IC engine 12 and second IC engine 14 include two types of drivetrain driven loads. Namely, first IC engine 12 drives a primary load associated with a threshing system 44, and second IC engine 14 drives a primary load associated with a hydrostatic propulsion 46. The threshing system loads are drivetrain loads associated with one or more of the following: a culling platform; a header; a feeder housing; a rotor; a separator; and a residue chopper.

The external loads driven by second IC engine 14 include two types of non-drivetrain, hydraulic or electrical loads; namely, auxiliary loads commanded by an operator and parasitic loads not commanded by an operator. In the embodiment of FIG. 2, the auxiliary loads 48 are non-drivetrain loads associated with one or more of the following: a heating and air conditioning system; a reel drive; a cleaning shoe drive; an air compressor for cleanout function; a vehicle lighting system; a clean, grain unloading system; a cleaning fan drive; a cutterbar/auger drive; a chaff/spreader a clean grain elevator; and an auxiliary electrical power outlet. All of these auxiliary loads 48 (except the lighting system and auxiliary electrical power outlet) are indicated as being electrically driven loads, powered by respective electric motors (each designated "M", but not specifically numbered).

The various motors M are selectively energized using an electrical processing circuit 50 (shown schematically in block form), which may include VCU 38, a rectifier and a DC-to-AC inverter. Electrical processing circuit 50 electrically couples second motor/generator 30 with, a motor M associated with a selected auxiliary load 40. When providing electrical power to one or more auxiliary loads 48, it will be appreciated that second motor/generator 30 is operated as a motor/generator with an electric power output. The auxiliary loads can also include one or more operator initiated hydraulic loads, not shown.

In the event that second IC engine 14 is not operating and electrical power is required for temporary powering of one or more auxiliary loads 48, an electrical storage battery 52 is also coupled with electrical processing circuit 50. Of course, a bank of batteries can be electrically connected together for a higher amp*hour rating. The power from battery 52 can be applied as DC power, or inverted and applied as AC power.

The auxiliary loads 48 can be hardwired to the electrical processing circuit 50, second motor/generator 30 and/or battery 52, or alternatively may be coupled using modular connectors or plugs (e.g., one or more of the electrical plug-in outlets shown in FIG. 2A). Further, the auxiliary loads 48 may be driven at the same or a different operating speed than the first IC engine 12. This allows the external load functions to be at a different speed than the threshing and propulsion functions, which can be important for certain operating conditions such as tougher crop material when approaching dusk, etc.

According to another aspect of the present invention, first motor/generator 22 and second motor/generator 30 are electrically coupled together, as indicated by electric power line 52. This allows Intelligent power management (IPM) by splitting the power needs between first IC engine 12 and second IC engine 14. Electric power can be transferred from first motor/generator 22 to second motor/generator 30, or vice versa, depending upon the power needs associated with primary loads 44 and 46, or auxiliary loads 48.

During a harvesting operation, first IC engine 12 is used to drive the threshing system and second IC engine 14 is used to drive the propulsion system. Concurrently, first IC engine 12 is used to drive first motor/generator 22 and second IC engine 14 is used to drive second motor/generator 30. The auxiliary loads 48 which are driven by second motor/generator 30 in turn add to the load placed on second IC engine 14. The temperatures associated with each of first IC engine 12 and second IC engine 14 are monitored using first temperature sensor 41 and second temperature sensor 45 to assure that engines 12 and 14 are not at or near an overload state.

In the event that one of the engines 12 or 14 is determined to be in an overload state, dependent on the respective sensed engine temperature, then electrical power is transferred between first motor/generator 22 and second motor/generator 30 to reduce the load on the overheated engine. For example, if the monitored temperature of first IC engine 12 is at or above a predetermined threshold value, then power is added to the output drivetrain from first IC engine 12 by transferring electrical power from second motor/generator 30 to first motor/generator 22. In other words, additional power is added by transferring electrical power to first motor/generator 22 and operating first motor/generator 22 in a motor mode.

Similarly, the same process of adding to the output of second IC engine 14 can be carried out using the same methodology as described above with regard to first IC engine 12. That is, if the monitored temperature of second IC engine 14 is at or above a predetermined threshold value, the output of second IC engine 14 can be increased by transferring electrical power to second motor/generator 30 operating in a motor mode.

Having described the preferred embodiment, it will become apparent that various modifications can be made without departing from the scope of the invention as defined in the accompanying claims.

The invention claimed is:

1. An agricultural harvester, comprising:
a first power unit couplable with a first primary load, said first primary load including a threshing system load;
a first temperature sensor associated with said first power unit, said first temperature sensor providing a first output signal;
a second power unit;
a second temperature sensor associated with said second power unit, said second temperature sensor providing a second output signal;
a first motor/generator mechanically coupled with said first power unit;
a second motor/generator mechanically coupled with said second power unit, said second motor/generator and said first motor/generator being electrically coupled together; and
at least one electrical processing circuit coupled with said first temperature sensor, said second temperature sensor, said first motor/generator and said second motor/generator, said at least one electrical processing circuit being configured for selective bidirectional transfer of electrical power between said first motor/generator and said second motor/generator, dependent on said first output signal and said second output signal.

2. The agricultural harvester of claim 1, wherein said first power unit and said second power unit are each an internal combustion (IC) engine with a radiator and an intake manifold.

3. The agricultural harvester of claim 2, wherein said first temperature sensor is positioned in association with one of:
said radiator of said first power unit to sense a temperature of a liquid coolant; and
said intake manifold of said first power unit to sense a temperature of intake air.

4. The agricultural harvester of claim 2, wherein said second temperature sensor is positioned in association with one of:
said radiator of said second power unit to sense a temperature of a liquid coolant; and
said intake manifold of said second power unit to sense a temperature of intake air.

5. The agricultural harvester of claim 1, wherein said second power unit is couplable with a second primary load, said second primary load including a propulsion load.

6. The agricultural harvester of claim 5, wherein said first power unit includes a first drive train and said second power unit includes a second drive train, said first primary load being driven by said first drive train and said second primary load being driven by said second drive train.

7. The agricultural harvester of claim 5, wherein each of said first motor/generator and said second motor/generator include a mechanical input, a mechanical output, and an electrical input/output.

8. The agricultural harvester of claim 1, wherein at least one of said first motor/generator and said second motor/generator are configured to electrically drive at least one external load.

9. The agricultural harvester of claim 8, wherein each said external load corresponds to one of a parasitic load and an auxiliary load, each said parasitic load being a non-drivetrain load without operator intervention, and each said auxiliary load being a non-drivetrain load with operator intervention.

10. A work machine, comprising:
a first power unit couplable with a first primary load;
a first temperature sensor associated with said first power unit, said first temperature sensor providing a first output signal;
a second power unit, said second power unit being mechanically independent from said first power unit;
a second temperature sensor associated with said second power unit, said second temperature sensor providing a second output signal;
a first motor/generator mechanically coupled with said first power unit;
a second motor/generator mechanically coupled with said second power unit, said second motor/generator and said first motor/generator being electrically coupled together; and
at least one electrical processing circuit coupled with said first temperature sensor, said second temperature sensor, said first motor/generator and said second motor/generator, said at least one electrical processing circuit being configured for selective bidirectional transfer of electrical power between said first motor/generator and said second motor/generator, dependent on said first output signal and said second output signal.

11. The work machine of claim 10, wherein said first power unit and said second power unit are each an internal combustion (IC) engine with a radiator and an intake manifold.

12. The work machine of claim 11, wherein said first temperature sensor is positioned in association with one of:
said radiator of said first power unit to sense a temperature of a liquid coolant; and
said intake manifold of said first power unit to sense a temperature of intake air.

13. The work machine of claim 11, wherein said second temperature sensor is positioned in association with one of:
said radiator of said second power unit to sense a temperature of a liquid coolant; and
said intake manifold of said second power unit to sense a temperature of intake air.

14. The work machine of claim 10, wherein said work machine is an agricultural harvester, and said second power unit is couplable with a second primary load, said second primary load including a propulsion load.

15. The work machine of claim 14, wherein said first power unit includes a first drive train and said second power unit includes a second drive train, said first primary load being driven by said first drive train and said second primary load being driven by said second drive train.

16. The work machine of claim 14, wherein each of said first motor/generator and said second motor/generator include a mechanical input, a mechanical output, and an electrical input/output.

17. The work machine of claim 10, wherein at least one of said first motor/generator and said second motor/generator are configured to electrically drive at least one external load.

18. The work machine of claim 17, wherein each said external load corresponds to one of a parasitic load and an auxiliary load, each said parasitic load being a non-drivetrain load without operator intervention, and each said auxiliary load being a non-drivetrain load with operator intervention.

19. The work machine of claim 10, wherein said work machine comprises one of a construction work machine, an agricultural work machine, a forestry work machine, a mining work machine, and an industrial work machine.

20. A method of operating an agricultural harvester, comprising the steps of:
- driving a threshing system load with a first power unit;
- driving a propulsion load with a second power unit, said second power unit being mechanically independent from said first power unit;
- driving a first motor/generator with said first power unit;
- driving a second motor/generator with said second power unit;
- sensing a first temperature associated with said first power unit and a second temperature associated with said second power unit;
- determining if one of said first power unit and said second power unit is in an overload state, dependent upon said first temperature and said second temperature, respectively; and
- bidirectionally transferring electrical power between said first motor/generator and said second motor/generator, dependent upon said determined overload state.

21. The method of operating a work machine of claim 20, wherein said first temperature is asociated with one of:
- a temperature of liquid coolant associated with said first power unit; and
- a temperature of intake air associated with said first power unit.

22. The method of operating a work machine of claim 20, wherein said second temperature is associated with one of:
- a temperature of liquid coolant associated with said second power unit; and
- a temperature of intake air associated with said second power unit.

* * * * *